United States Patent [19]
Nations

[11] 3,772,690
[45] Nov. 13, 1973

[54] VEHICLE SAFETY APPARATUS
[75] Inventor: Carl T. Nations, Seminole, Fla.
[73] Assignee: Sperry Rand Corporation, New York, N.Y.
[22] Filed: Dec. 7, 1971
[21] Appl. No.: 205,592

[52] U.S. Cl. .............................. 343/7 ED, 343/12 R
[51] Int. Cl. ............................................... G01s 9/02
[58] Field of Search....................... 343/7 ED, 12 R

[56] References Cited
UNITED STATES PATENTS
| | | | |
|---|---|---|---|
| 3,710,383 | 1/1973 | Cherry et al. ................. | 343/7 ED |
| 2,851,120 | 9/1958 | Fogiel........................... | 343/7 ED X |
| 3,684,309 | 8/1972 | Uchiyamada et al......... | 343/7 ED X |

*Primary Examiner*—T. H. Tubbesing
*Attorney*—Howard P. Terry

[57] ABSTRACT

A vehicle safety apparatus includes radio means for the detection of an impeding collision immediately prior to the contact of a protected vehicle with another vehicle or other object and for the actuation of restraining or other protective devices for the protection of the occupants of the vehicle when the crash actually occurs. Modulated continuous wave high frequency transmitter and receiver apparatus is employed for processing reflected object signals having a wide range of possible amplitudes at the receiver. Range and range rate signals are generated and compared for actuation of passenger restraints or other protective devices.

13 Claims, 4 Drawing Figures

VEHICLE SAFETY APPARATUS

BACKGROUND POF THE INVENTION

1. Field of the Invention

The invention pertains to safety apparatus for the detection of an impending vehicular collision and for the automatic operation of protective devices and more particularly concerns means for utilizing reflected modulated continuous wave radio signals for the generation of distinct control signals according to the range and relative speed of the reflecting object with respect to the protected vehicle.

2. Description of the Prior Art

Those seeking to devise means for protecting vehicle passengers in actual collisions between vehicles or between a vehicle and another object have sought to use crude mechanical sensors in the form of decelerometer-like devices which in theory operate only after the collision impact occurs; i.e., these devices are not capable of anticipating the crash event. For example, one such mechanical sensor device includes a mass which is biased in an inactive position against a stop by plural spring contact members. During an actual collision, the mass is designed to move, overcoming the spring bias and activating a safety device such as a passenger restraining gas bag. Because such sensors lack the capability of anticipating a crash event, they are actuated, where they do perform reliably, always after the passenger's body has started to move toward the vehicle dash board; i.e., the passenger is struck by the gas bag moving toward him relatively faster than the dash board of the vehicle.

In this and in similar mechanical sensors which have been proposed for safety device actuation, the apparatus is presumed to be always in condition to operate satisfactorily, while in fact it may have remainded in a dormant, untended, and untested condition for months or even years. Fail-safe and operability monitoring instrumentalities are not present, and more important, are generally incapable of application to such devices, since such decelerometer devices are designed as strictly one-shot mechanical devices and do not readily accommodate themselves by nature to testing. While these prior art deceleration sensing devices are theoretically devised to be actuated at a particular impact level, there is little hope that they can demonstrate accurately repeatable and reliable characteristics in actual practice.

SUMMARY OF THE INVENTION

The present invention relates to vehicular safety systems that include radio transmitter and receiver means for the detection of a potential collision of a protected vehicle with another vehicle or other object immediately prior to the impact and for actuation of restraining or other safety devices also just prior to the collision for the protection of occupants of the vehicle before the crash event actually occurs. The radio sensor employs directive radio transmission and reception of amplitude modulated energy to detect a forward located obstacle, measuring the range of the obstacle by employment of cross over detection of the phase lag of the detected modulation with respect to the phase of a reference signal. Reception of signals having a wide dynamic amplitude range is accomplished, permitting accurate operation of the cross over detector device. Range and range rate signals are then generated and compared for actuating passenger restraint or other devices.

DESCRIPTION OF THE PREFERRED EMBODIMENT

Figure 1:
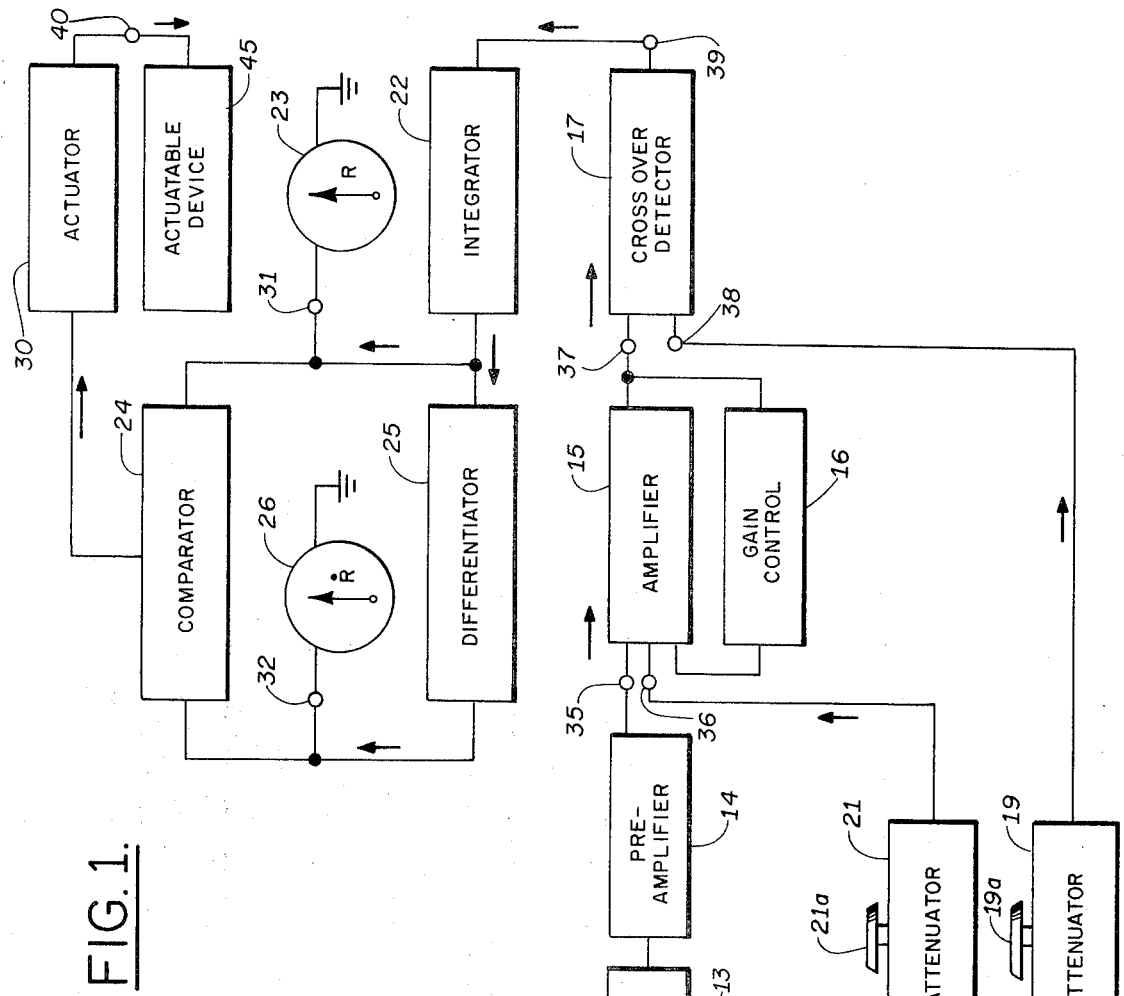
FIG. 1 is a partial plan view of a vehicle incorporating the invention, together with a block diagram showing the components of the invention and their electrical interconnections.
Figure 1:
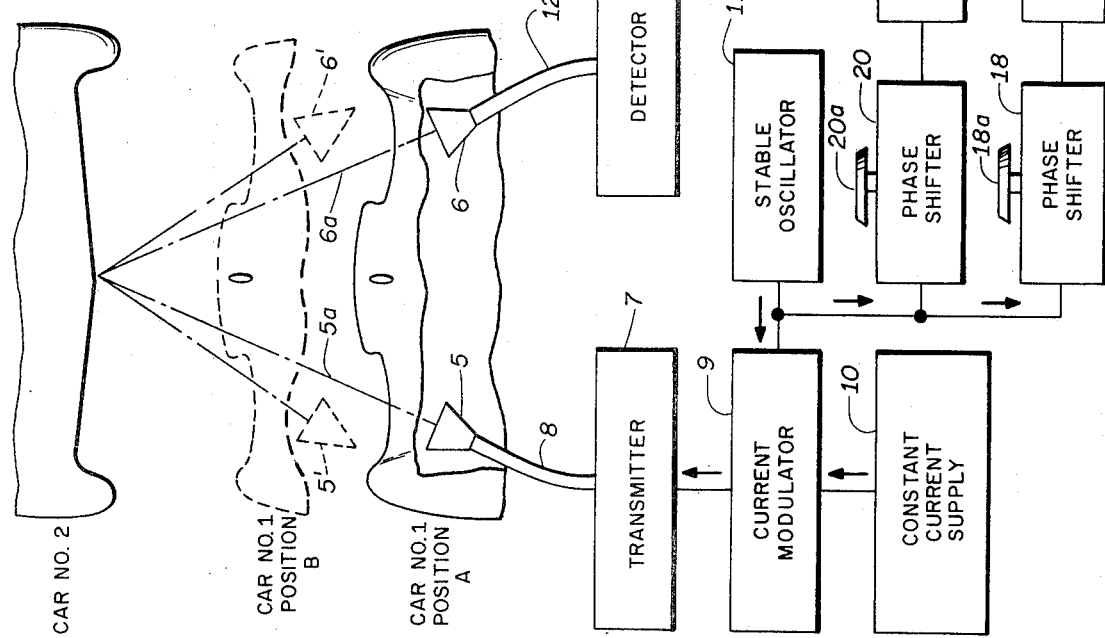

FIG. 1 illustrates the front of a vehicle or car 1 in successive positions A and B with respect to the rear of a second vehicle or car 2. It will be understood that both of the cars 1 and 2 may be moving, and otherwise that relative motion between the two cars may cause car 1 to move from position A to a position such as position B, thus decreasing the distance between the two vehicles. Should the relative speeds differ and that difference be maintained, a contact between the two vehicles is inevitable. If the maintained relative speed is above a nominal value, substantial collision damage to the cars and to their occupants is a probable consequence. It will be recognized that car 2 may be a stationary vehicle or may be a normally stationary object such as a metal highway barrier or wall.

According to the invention, impending collisions of the above kind with vehicles or other objects are detected for the purpose of operating safety devices of known types for the reduction of damage to one or both vehicles and of injuries to vehicle occupants. For this purpose, there is provided within car 1 a continuous wave radio transmitter and receiver system for radiating electromagnetic energy toward the rear of car number 2 and for receiving energy reflected therefrom.

A transmitter antenna 5 may be located at the left side of car 1 behind a dielectric grille at the front of the car, with a radiation pattern directed in a generally forward manner toward any obstacle to forward motion of car 1 that might be present, such as car 2. A receiver antenna 6 is similarly mounted at the right side of car 1 behind the dielectric grille, being directed so that the receptivity pattern is arranged to collect signals reflected from an obstacle, such as the rear of car 2. It will be apparent to those skilled in the art that the dash-dot lines 5a and 6a are intended in a general way to represent paths taken by radiation transmitted by antenna 5, reflected at a representative reflecting point on car 2, and received by receiver antenna 6. Antennas 5 and 6 preferably are of the conventional pyramidal horn type and have respective radiation and receptivity patterns sufficiently wide for echo energy to be collected generally from the rear or other part of car 2. It will be understood that the distance R between the interacting cars and the time rate of change $\dot{R}$ of that distance are used, according to the invention, as criteria for automatically assessing the risk of a collision.

Transmission line 8 couples the directive antenna 5 to transmitter 7, which latter may be a relatively low power output, semiconductor oscillator operating in the high frequency or microwave range. A representative carrier frequency for transmitter 7 would be 10 GHz with a power output of about 100 milliwatts.

Transmitter 10 is supplied with energy from a conventional constant current source 10. The unidirectional current input to current modulator 9 is first amplitude modulated by modulator 9 before application to transmitter 7 with a sine wave signal originating in stable oscillator 11. Oscillator 11 may be a conventional crystal controlled oscillator having a stable output frequency, for example, of 2.5 MHz, which signal is used to operate current modulator 9 and also for phase reference purposes, as will be seen.

Transmitter 7 may be a semiconductor diode oscillator selected from available conventional types. Diode oscillators found suitable include those of the general type shown in the C.T. Rucker U.S. Pat. No. 3,605,034 for "Coaxial Cavity Negative Resistance Amplifier and Oscillators," issued Sept. 14, 1971, or in the M.I. Grace U.S. Pat. application Ser. No. 17,673, now U.S. Pat. No. 3,646,581 for a "Semiconductor Diode High Frequency Signal Generator," filed Mar. 9, 1970, both inventions being assigned to the Sperry Rand Corporation. Other diode oscillators may be used, including oscillators such as employ impact avalanche transit time or IMPATT semiconductor diodes.

The receiver directive horn antenna 6 is similar to transmitter horn antenna 7 and is coupled by wave guide 12 to detector 13. To reduce any direct coupling between antennas 5 and 6, the antennas are spaced apart at an appropriate distance to achieve sufficient isolation. Detector 13 is a conventional broad band crystal detector device for demodulating the reflected modulated high frequency signal collected by receiver antenna 6 and for passing the modulation envelope to preamplifier 14, which latter provides adequate gain for the modulation signal to be processed effectively in the remainder of the radio receiver.

The gain controlled amplifier 15, whose character will be discussed in more detail in connection with FIG. 2, consists of several amplification stages and is controlled by an automatic gain control circuit 16 that feeds back a gain control signal to the input of amplifier 15. Amplifier 15 may provide a wide range of gains for the input 2.5 MHz signal, producing a substantially constant amplitude output. The gain control 16 has a range, for example, of 110 dB. in view of the wide dynamic range of the signals received by antenna 6. A constant output is desired from amplifier 15, as will be seen, since an output signal of varying amplitude will cause spurious phase shifts in the cross over detector 17. Such spurious phase shifts may not be tolerated, as they would appear as changes in apparent target range, thereby introducing ranging errors.

In addition to the output of amplifier 15, a second signal of the same (2.5 MHz) frequency is supplied to cross over detector 17. This second signal is coupled from stable oscillator 11 to an input of cross over detector 17 via adjustable phase shifter 18 and adjustable attenuator 19. Phase shifter 18 and attenuator 19, being adjustable, provide trimming or calibration adjustments for the radio system, as will be seen. The output of stable oscillator 11 is also supplied through a further channel including adjustable phase shifter 20 and adjustable attenuator 21 to an input of amplifier 15, as will be further discussed, to aid in countering the adverse effect of any signal from transmitter antenna 5 undesirably directly coupled to the receiver via receiver antenna 6.

Cross over or zero crossing detector 17 is, as previously noted, supplied with an attenuated and phase adjusted version of the output of stable oscillator 11 as a reference signal and also with the constant voltage output signal supplied by amplifier 15. Cross over detector 17, which will be discussed in greater detail in connection with FIG. 3, embodies an output pulse generating circuit which initiates the output pulse at the instant that the reference sine wave from phase shifter 18 and attenuator 19 passes through the zero voltage level. Further, the circuit ends the output pulse at the instant that the return sinusoidal modulation signal passes through its zero level. Consequently, each pulse of the output train of circuit 17 is a pulse whose instantaneous duration is a direct function of the time difference between the zero crossing point of the two signals. With phase shifter 18 correctly set, this time difference or pulse width is a direct measure of the period of time required for the signal radiated by antenna 5 to travel to a reflecting target and back to the receiver antenna 6.

The energy within the variable width pulses of the train of pulses generated by cross over detector 17 is integrated by the conventional time integrator circuit 22. Integrator 22 receives these pulses and integrates them, producing a unidirectional voltage level proportional in amplitude to the pulse width or to reflecting target range. The integrated output may be supplied through terminal 31 to a simple electrical meter 23 for observation of target range R and is coupled as one input to comparator circuit 24. The output of integrator 22 is further supplied to a conventional differentiator circuit 25 which operates in the usual manner to produce a unidirectional voltage proportional to rate of change of distance R, or $\dot{R}$. The value $\dot{R}$ may be supplied for visual observation via terminal 32 to an electric meter 26, and is supplied to a second input of comparator circuit 24.

When the input voltage levels R and $\dot{R}$ applied to comparator 24 reach predetermined levels, the comparator 24 produces an output signal for application to actuator 30. The actuator 30 responds by operating an actuatable device 45, which latter may be the hydraulic brakes of car 1 or other protective devices such as an inflatable gas bag device for the restraint and protection of passengers within car number 1. A device of this latter type will be considered in connection with FIG. 4. It will be readily understood by those skilled in the art that other conventional types of displays or alarms, latching, pulsing, or otherwise operating, may be attached to terminals 31 or 32 in place of or supplementing meters 23 and 26.

Figure 2:
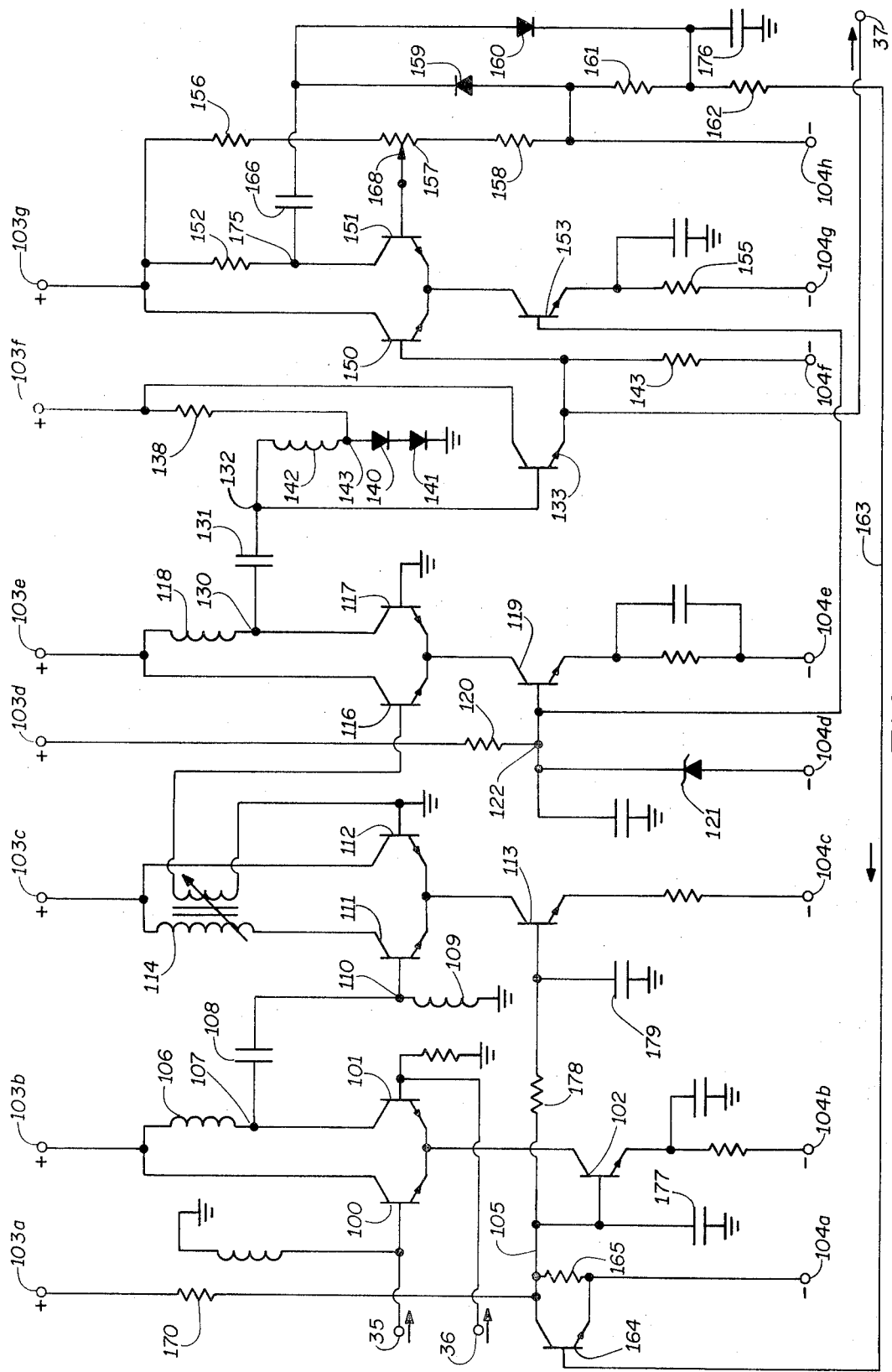
FIGS. 2 and 3 are detailed circuit drawings of parts of the electrical system of FIG. 1.

The amplifier 15 and its relation to gain control circuit 16 are shown in greater detail in FIG. 2; the output of preamplifier 14 is coupled via terminal 35 to the base electrode of transistor 100, which transistor forms with the substantially identical transistor 101 active elements of a conventional high gain, broad band differential amplifier circuit. As in the usual practice in differential amplifiers, transistors 100, 101, are inserted between a source 103b of positive potential with their emitter electrodes coupled in common through a transistor 102 to a source 104b of negative potential. Transistor 102 may be controlled by a gain control signal developed on lead 105, as will be described, so as to change the gain of the transistor pair 100, 101. Transistor 100, 101 may be of the 2N918 type, while transistor 102 may be a 2N2222 transistor. This first differential amplifier stage uses an input on terminal 36 taken from phase shifter 20 for spill-over compensation between antennas 5 and 6 and, as noted above, uses the distance information bearing output of preamplifier 15 on terminal 35 to supply an amplified sine wave output signal to be taken at terminal 107 between the collector electrode of transistor 101 and the choke 106 found in the positive potential lead 103b.

The sine wave signal on terminal 107 is coupled at the terminal 110 by the grounded series circuit comprising capacitor 108 and choke 109 to the base electrode of transistor 111 in a second conventional transistor differential amplifier also employing a second paired transistor 112 whose base is grounded. The differential amplifier circuit associated with transistors 111, 112 is generally similar to that using transistors 100, 101, also having a transistor 113 in the circuit connecting its emitter electrodes to the negative potential terminal 104c. Gain control transistor 113 operates by virtue of the control signal appearing on lead 105. Transistors 111, 112, may be of the 2N918 type, while transistor 113 may be of the 2N2222 kind. The collector electrodes of transistors 111, 112 are coupled to positive terminal 103c, the collector electrode of transistor 111 being in series circuit with the primary of a variable transformer 114 whose secondary provides the amplified output of the stage, the tuned collector circuit providing operation of the circuit as a narrow band high gain amplifier.

A third stage of amplification is associated with differential amplifier transistors 116 and 117, connected substantially in a similar manner to transistors 100, 101. Transistor 119, connected in series with the emitter electrodes of transistors 116, 117 and the negative terminal 104e, provides a constant gain control influence over transistors 116, 117, since the base electrode of transistor 119 is controlled by the substantially constant potential of terminal 122. Terminal 122 lies in a series circuit leading from positive terminal 103d through resistor 120, terminal 122, Zener or similar diode 121, and negative terminal 104d. By virtue of the well known regulator characteristics of Zener diode 121, the voltage of terminal 122 is held substantially constant, and therefore the gain of the differential amplifier employing transistors 116, 117 is held substantially constant. The sine wave output signal of the circuit is taken at terminal 130 lying between the collector electrode of transistor 117 and choke 118 in the positive potential lead 103e and is capacity (131) coupled at terminal 132 to a branching utilization circuit yet to be described. Transistors 116 and 117 may be of the 2N918 type, transistor 119 of the 2N2222 type, and Zener diode 121 of the 1N751A type. The gain through the three differential amplifier stages may be on the order of 112 dB.

The sine wave signal is coupled from terminal 130 through capacitor 131 to the base electrode of transistor 133, whose emitter electrode directly supplies the signal to the output terminal 37 for application as one input to cross over detector 17. Connected as an emitter follower device, transistor 133 provides a proper impedance matching interface to drive any coaxial or other transmission line that may be used between the amplifier system 15 and the zero crossing detector 17. For this purpose, the unidirectional potential of the base electrode of transistor 133 is set by the voltage divider circuit including resistor 138 connected to positive terminal 103f and to a terminal 143 between choke 142 and the series connected regulator diodes 140, 141. The end of choke 142 opposite terminal 143 is connected to terminal 132 and thus supplies a proper regulated voltage to the base electrode of transistor 133. The collector of the latter is directly coupled to positive terminal 103f, while its emitter electrode is coupled through resistor 143 to negative source terminal 104f. Transistor 133 may be a 2N918 transistor, while diodes 140 and 141 may be of the 1N645 kind.

The sine wave output of emitter follower transistor 133 is coupled to the base electrode of transistor 150 which transistor, together with the paired transistor 151, functions in a fourth differential amplifier circuit operating as a comparator device for generating a gain control error voltage on lead 163. The base electrode of transistor 150 is connected also through a resistor 143 to negative terminal 104f. The collector electrode of transistor 150 is coupled directly to positive terminal 103g, while the collector electrode of transistor 151 is coupled through resistor 152 to the same terminal 103g. A voltage divider comprising series connected resistors 156, 157, 158 is connected between positive source 103g and negative source 104h for permitting a tap 168 on resistor 157 to supply a unidirectional reference voltage to the base electrode of transistor 151. The gain of transistors 150, 151 is held substantially constant by a transistor 153 connected between the emitter electrodes of transistors 150, 151 and the negative source terminal 104g. Gain control is effected, as in differential amplifier transistors 116, 117 by the regulated voltage at terminal 122 produced by Zener diode 121. Transistors 150, 151 may be 2N918 transistors, while transistor 153 may be of the 2N2222 type.

The comparator circuit utilizing transistors 150, 151 acts as a threshold comparator circuit in which the amplitudes of the peaks of the sine wave input to transistor 150 are compared to a threshold value set into transistor 151 by the adjustment of tap 168 on resistor 157. As the peak amplitude value increases above the threshold value, a pulsing error signal is generated at terminal 175 which is capacity (166) coupled to activate rectifier diodes 159, 160. Diode 159 is poled as indicated and is coupled between condenser 166 and negative supply terminal 104h, while diode 160 is poled oppositely to diode 159 and is coupled between condenser 166 and ground. The circuit elements associated with diodes 159, 160 providing filtering or smoothing of the unidirectional error signal output of rectifiers 159, 160 include capacitors 176, 177, and 179 and resistor 178. Tap 168 of resistor 157 may be adjusted so as to supply a 4 volt unidirectional bias output on lead 163 for control of transistor 164. In the rectifier circuit, diodes 159, 160 may be of the 2301 type.

Lead 163 supplies the gain control bias or error signal to the base electrode of transistor 164 which is connected as a voltage variable resistor across resistor 165. The latter resistor is connected, it will be recalled, in a voltage divider circuit including resistor 170 for supplying gain control signals via lead 105 to control the transistors 102 and 113. The gain control transistor 164, being in parallel with resistor 165, causes the potential level developed across resistor 165 to change in proportion to the amplitude of the sine wave signal driving transistor 150. The varying potential level is used in the conventional manner to vary the operating point of the transistor pairs 100, 101 and 111, 112.

It will be understood by those skilled in the art that the positive terminals 103a to g may be a single terminal supplied with a voltage on the order of +6 volts, while the negative terminals 104a to h may be a single terminal supplied, for example, from a −6 volt source. It will be also appreciated by those skilled in the art that various chokes and capacitors may be located in the conventional manner throughout the circuit of FIG. 2 in association with terminals 103a to g and 104a to h wherever it is found necessary to provide conventional power supply by-pass paths and to provide isolation proper for preventing the occurrence of undesirable oscillations.

Figure 3:
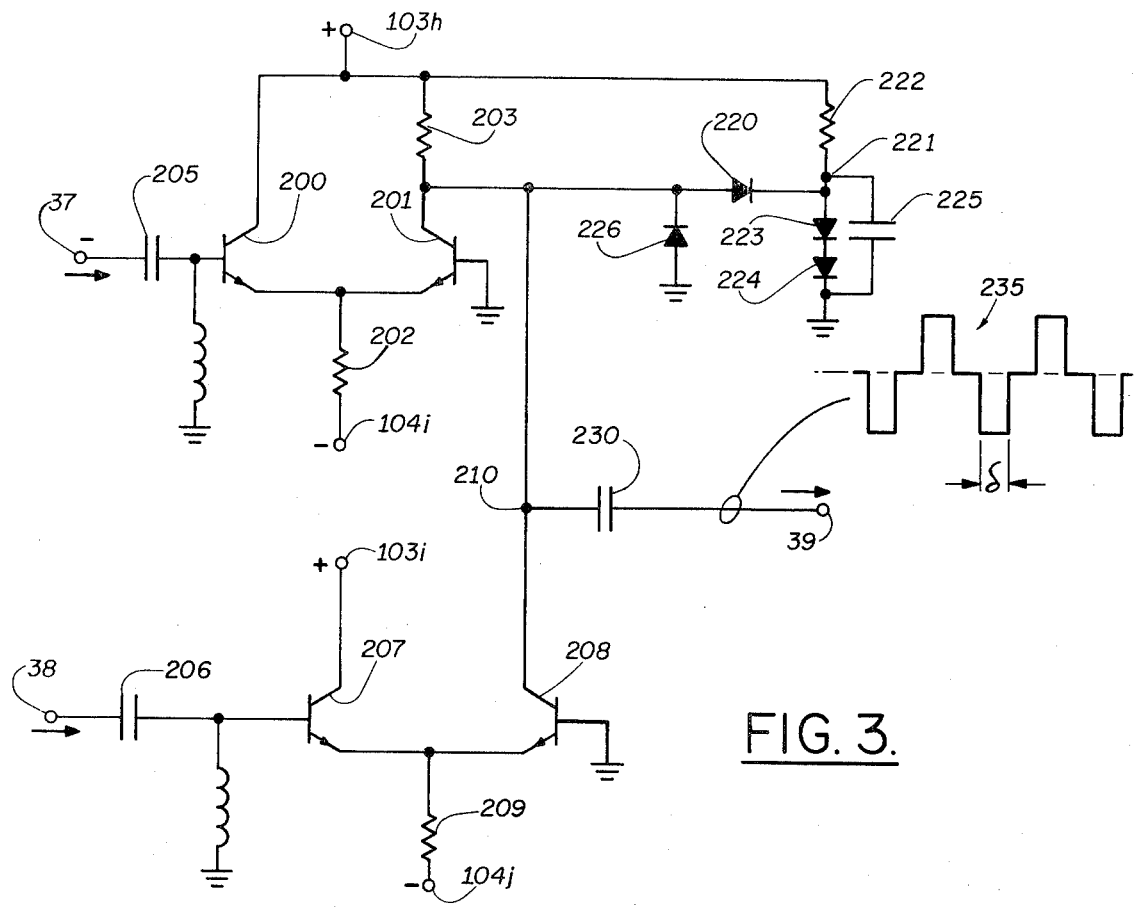

As previously noted, the output of the circuit of FIG. 2 at terminal 37 comprises one input to cross over detector 17, shown in detail in FIG. 3. A second input appears on terminal 38 of FIG. 1. In FIG. 3, cross over detector 17 is seen to use two similar differential amplifiers as input circuits.

The differential amplifier to which the signal on terminal 37 is fed through coupling condenser 205 comprises a transistor pair 200, 201 with emitter diodes connected in common through resistor 202 to a negative voltage source 104i. The collector electrode of the input transistor 200 is coupled directly to positive voltage terminal 103h, while the collector electrode of transistor 201 is supplied through resistor 203 by positive terminal 103h.

The differential amplifier to which the reference signal on terminal 38 is fed through condenser 206 has that input signal supplied to the base electrode of transistor 207, one of a transistor pair including the substantially identical paired transistor 208. Transistors 207, 208 have their emitter electrodes connected in common through resistor 209 to negative voltage terminal 104j. The collector electrode of input transistor 207 is coupled directly to positive voltage terminal 103i, while the collector of transistor 208 is supplied through resistor 203, also used by transistor 201, to positive terminal 103h. Since the two differential amplifiers use resistor 203 in common, a single output in the form of a combination of the inputs on terminals 37, 38 appears at output terminal 210. The output pulse at terminal 210 is initiated at the instant of time that the reference sine wave applied to transistor 207 passes through its zero voltage level and is ended at the instant that the echo modulation sinusoid passes through its voltage zero value. Transistors 200, 201, 207, 208 of the two amplifiers are selected to have repeatable and very fast current mode current turn on and turn off properties and may be of the 2N5841 kind.

The common output at terminal 210 also permits use of one circuit in common with the two differential amplifiers of cross over detector 17 for preventing their saturation. Since operation under saturated conditions may differently affect the turn on and turn off characteristics of transistors 201 and 208, it is desirable that such operation be prevented. The anti-saturation circuit involves a diode 226 connected between terminal 210 and ground. One side of diode 220 is connected to output terminal 210 and poled as shown, and the other side of diode 220 is coupled to ground through series diodes 223, 224, poled opposite to diode 226 and shunted by capacitor 225. The diode circuit forms a continuous conducting path for positive half cycles. Terminal 221 is also connected through resistor 222 to the positive source terminal 103h. Diodes 220 and 226 may be of the 2301 kind, while the series diodes may be 1N914 diodes.

The clamping circuit has the function of modifying the symmetric wave 235 which would otherwise appear on terminal 39, by removing the positive half of the wave form, permitting only the negative half to be capacity 230 coupled to terminal 39. The circuit operates as follows. When the input signal to transistor 200 crosses the zero voltage level during its negative swing, transistor 200 is turned off and transistor 201 is driven into conductance. Since the forward voltage drop across diode 226 is less than the base-to-emitter voltage of transistor 201, the collector of transistor 201 is prevented from reaching the saturation level by the clamping action of diode 226. Similarly, transistor 208 is prevented from being driven into saturation by diode 226 when transistor 207 is turned off during the negative excursion below the zero cross over voltage of the input signal to terminal 38. The useful output signal, comprising a train of negative pulses whose individual widths δ vary directly as the distance to the reflecting target varies, appears at output terminal 39. It will be recognized that other cross over detector circuits similar in function to that of the FIG. 3 circuit may be substituted for it. In particular, the measurement circuit may be of the type disclosed in the C.T. Nations, D.C. Davis U.S. Pat. No. 3,582,678 for a "Pulse Interval Measurement Apparatus," issued June 1, 1971 and assigned to the Sperry Rand Corporation.

After integration in circuit 22, which may be an integrating operational amplifier of conventional type, and then differentiation in the known circuit 25, the outputs of circuits 22 and 25 as seen in FIG. 1 may be applied to comparator 24. As noted previously, suitable combinations of R and Ṙ values will cause actuator 30 to operate protective device 45.

The output of actuator 30 appearing at terminal 40 in FIG. 1 may be beneficially employed in various ways; it may be used to provide a visual or audible warning of the impending collision event or may be used to actuate conventional protective devices, such as inflatable gas bag devices, for reducing the possibility of injury to a passenger whose body would otherwise strike the dashboard or other part of the vehicle. For example, in FIG. 4 the output at terminal 40 may be applied to operate a lamp whose optical path projects through an aperture 310 in speedometer dial 311 and whose illumination may therefore be viewed by occupants of the vehicle. A horn (not shown) having a strident tone may be actuated by the output of actuator 30 for the same purpose.

Figure 4:
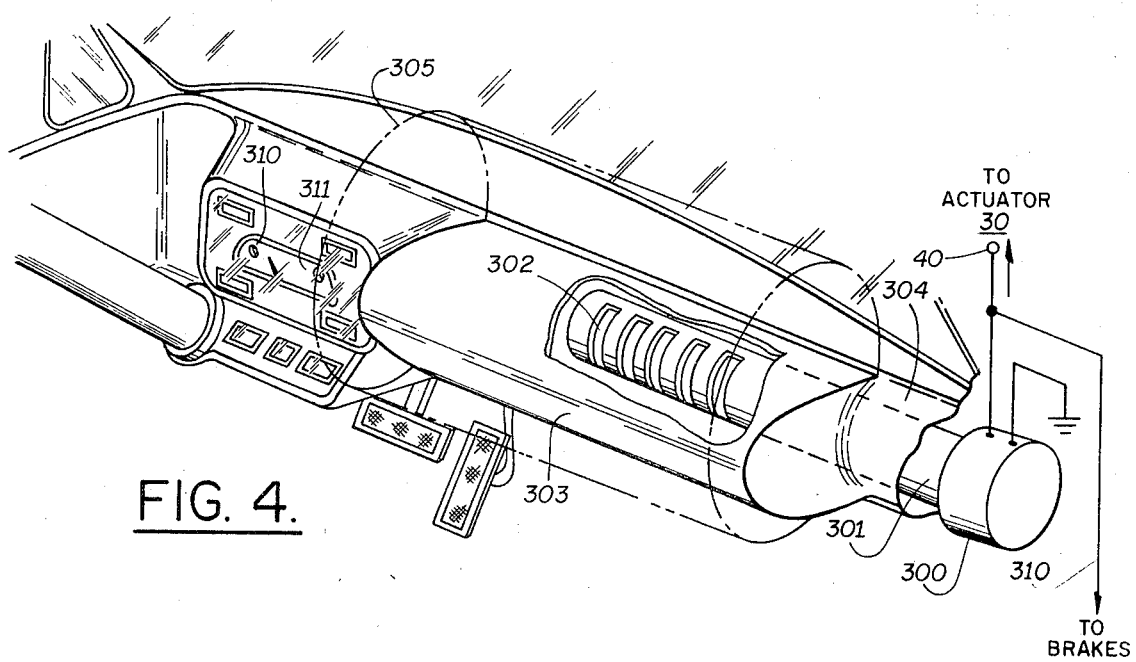
FIG. 4 is a fragmentary perspective view of an interior of a vehicle employing the invention.

Various protective devices may similarly be operated by actuator 30, such as the gas bag restraint device of FIG. 4. This conventional safety apparatus comprises, in general, a container or reservoir 300 of a gas-producing medium and a pipe 301 with a plurality of gas diffusing slots such as slot 302. The container 300 contains a conventional actuating mechanism for controlling release of gas from the medium within container 300 so that it flows through diffuser slots 302 into the gas bag 303, causing the latter rapidly to expand.

The release of gas may be brought about by the signal applied to terminal 40 causing a detonator (not shown) to explode an explosive substance within container 300. The gas produced by the explosion forces its way out of container 300 into pipe 301 and through slots 302. Alternatively, the presence of a signal on terminal 40 may be used to cause a valve within container 300 to release gas from a high pressure storage vessel. Other arrangements are known to those skilled in the art, including those in which deflation of the gas bag after a crash can be accomplished by the manual operation of a suitable valve or by automatic time delayed release of the gas.

Flow of gas from diffuser slots 302 causes inflation of gas bag 303. The inflatable bag 303 is normally in a dormant collapsed or folded condition as shown at 303 in FIG. 4, and may be aesthetically contoured so as to give the general appearance of a continuation of the vehicle dashboard 304. The inflatable bag 303 is secured in sealed relation about the diffuser pipe 301, and is therefore inflated to the position indicated by the dash-dot lines 305 upon release of gas from container 300. In the event of a collision, the gas bag 303 is expanded rapidly, forming a cushion between occupants facing the vehicle dash, and restraining the passengers so that they do not collide with the dashboard or windscreen as the vehicle is rapidly decelerated. It will be understood by those skilled in the art that additional gas bags in other locations within the vehicle may be used to protect other passengers from impact with the sides, roof, or other parts of the vehicle interior. Furthermore, as suggested in FIG. 4, the output of actuator 30 appearing at terminal 40 may be supplied via electrical lead 310 to a suitable means such as a solenoid for actuating vehicle brakes, assuming that they have not already been applied by the vehicle driver. While automatic actuation of brakes will not necessarily diminish the actual chance of collision, at least some of the vehicle energy will be dissipated, reducing consequent probabilities of destruction of life and property.

It is seen that the novel collision sensor system provides reliable and repeatable operation through the use of nonmechanical apparatus for detection of a collision situation prior to the event rather than being dependent upon mechanical forces generated in an actual collision. Sensing of the impending event is accomplished immediately prior to the contact of the protected vehicle with another vehicle or object for the reliable actuation of passenger restraint or other protective devices. Modulated continuous wave high frequency transmitter and receiver apparatus of simple and reliable nature is employed for sensing the potential event, being responsive to a wide dynamic range of reflected modulated signals at the receiver. Cross over detection means accurately generates range signals and these signals are compared with derived range rate signals for actuation of protective devices. Means are provided for accurate compensation of the range output for time of transit of signals within the radio sensor, so that accurate measurement of close ranges may be achieved. Further, means for compensating the undesirable effects of spill over of energy from the transmitter antenna to the receiver antenna are provided. The selected system provides data not critically dependent on the modulation sensitivity of the high frequency transmitter. Requiring a relatively narrow carrier frequency band, the band width of all circuits is reduced as compared to those of conventional frequency modulation and conventional pulse ranging systems, leading to a simple, inexpensive system and more efficient use of the available radio spectrum.

While the invention has been described in its preferred embodiment, it is to be understood that the words which have been used are words of description rather than of limitation and that changes within the purview of the appended claims may be made without departing from the true scope and spirit of the invention in its broader aspects.

I claim:

1. Vehicle safety apparatus comprising:
   radio measurement means adapted to be carried by said vehicle,
   integrating means responsive to said measurement means for producing a measure of the distance between said vehicle and an object,
   differentiating means responsive to said integrating means for producing a measure of the rate of change of said distance,
   comparator means responsive to said integrating means and to said differentiating means for producing an output when said respective measures have predetermined relative values, and
   safety means responsive to said comparator means.

2. Apparatus as described in claim 1 wherein said safety means comprises passenger protective means operative in response to said comparator means output.

3. Apparatus as described in claim 2 wherein said passenger protective means comprises means for restraining vehicle occupants from impacting interior parts of said vehicle.

4. Vehicle safety apparatus comprising:
   radio measurement means adapted to be carried by said vehicle including:
      transmitter means for transmitting an amplitude modulated carrier wave toward said object,
      modulator means for modulating said carrier wave,
      receiver means for receiving amplitude modulated carrier waves reflected by said object, and
      circuit means responsive to said receiver means and to said modulator means for producing an output train to like polarity pulses having widths each proportional to the instantaneous value of said distance,
   integrating means responsive to said circuit means for producing a measure of the distance between said vehicle and an object,
   differentiating means responsive to said integrating means for producing a measure of the rate of change of said distance,
   comparator means responsive to said integrating means and to said differentiating means for producing an output when said respective measures have predetermined relative values, and
   safety means responsive to said comparator means.

5. Apparatus as described in claim 4 wherein said circuit means comprises:
   cross over detector means responsive to said receiver means and to said modulator means for producing an output train of alternating polarity pulses varying in width according to the instantaneous distance between said distance measurement means and said object, and
   means responsive to said detector means for passing pulses of said output train of one polarity only.

6. Apparatus as described in claim 5 additionally including means responsive to said modulator means for permitting manual adjustment of the phase and amplitude of the output of said modulator means applied to said cross over detector means for compensation for the phase delay of signals propagating within said radio measurement means.

7. Apparatus as described in claim 4 additionally including substantially constant-output amplifier means responsive to said receiver means for supplying an input to said circuit means.

8. Apparatus as described in claim 7 wherein said substantially constant-output amplifier means is additionally responsive to the output of said modulator means for compensating for the adverse effects of direct spill over of modulated carrier waves from said transmitter means to said receiver means.

9. Distance measurement means comprising:
transmitter means for transmitting an amplitude modulated carrier wave toward an object,
modulator means for modulating said carrier wave,
receiver means for receiving amplitude modulated carrier waves reflected by said object,
constant-output amplifier means responsive to said receiver means,
cross over detector means responsive to said amplifier means and to said modulator means for producing an output train of alternating polarity pulses each varying in width according to the corresponding distance between said distance measurement means and said object,
means responsive to said detector means for passing pulses of said output train of only one polarity, and
means for intergrating said pulses of one polarity for producing a unidirectional signal substantially proportional to said distance.

10. Apparatus as described in claim 9 additionally including vehicle passenger restraint means responsive to said means for integrating.

11. Apparatus as described in claim 9 wherein said constant-output amplifier means is additionally responsive to said modulator means for compensating for adverse effects of direct spill over of said carrier waves from said transmitter to said receiver.

12. Apparatus as described in claim 9 including means responsive to said modulator means for permitting adjustment of the output of said modulator means applied to said cross over detector means for compensating for the time of propagation of distance measurement signals within said radio measurement means.

13. Apparatus as described in claim 9 wherein said constant-output amplifier means comprises:
variable gain controlled differential amplifier means responsive to said modulator means and to said reflected amplitude modulation,
tuned variable gain controlled amplifier means responsive to said differential amplifier means,
fixed gain amplifier means responsive to said tuned amplifier means,
emitter follower means responsive to said fixed gain amplifier means, and
means responsive to said emitter follower means for controlling the gain of said variably gain controlled differential amplifier means and said tuned amplifier means over a wide dynamic range.

* * * * *